Patented Nov. 21, 1944

2,362,988

UNITED STATES PATENT OFFICE 2,362,988

MORDANT TRIAZOLE DYESTUFFS AND PROCESS FOR MAKING THE SAME

Achille Conzetti, Basel, and Otto Schmid, Muttenz, near Basel, Switzerland, assignors to J. R. Geigy A. G., Basel, Switzerland, a Swiss corporation No Drawing. Application October 20, 1941, Serial No. 415,822. In Switzerland November 26, 1940

7 Claims. (Cl. 260—308)

It is known that o-aminoazo dyestuffs can be converted into 2-aryl-1:3-arylentriazoles by means of oxidation. As suitable oxidising agents there may be cited salts of the hypochlorites and cupric tetrammine salts. Furthermore it is known that also o-nitro azo dyestuffs can be converted into 2-aryl-1:3-arylentriazoles. Alkali sulfides and zinc-ammonia water among others has become known as suitable reduction agents. Such 2-aryl-1:3-arylentriazoles are colorless to weakly yellowish bodies which are not dyestuffs in the technical sense.

It has now surprisingly been found that 2-aryl-1:3-arylentriazoles containing in both the aromatic nuclei each time in ortho- or peri-position to a triazole nitrogen atom still a metallisable group are converted in substance or on the fibre into colored complex compounds of a mostly yellow color by treatment with metal yielding agents, such as chromium or copper yielding agents. These complex dyestuff metal compounds are distinguished by a very good, in some cases by an excellent light-fastness.

The new 2-aryl-1:3-arylentriazoles according to the present invention correspond to the formula

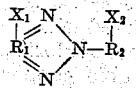

wherein $R_1$ and $R_2$ each represents an aromatic radical of the benzene or naphthalene series, at least one being a naphthalene radical, $X_1$ and $X_2$ being members of the group consisting of OH, COOH, halogen and alkoxy each situated in one of the positions ortho and peri to the triazole group.

The above defined mordant triazole compounds are obtained for example by oxidation of o-amino azo dyestuffs the general formula

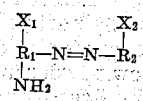

wherein $R_1$ and $R_2$ mean aromatic radicals, whilst $X_1$ and $X_2$ mean metallisable groups, such as the hydroxyl or carboxyl group, standing in ortho- or in peri-position to the azo bridge or substituents which can be converted into metallisable groups such as, for instance, halogen or alkoxy groups. These compounds are converted, by means of oxidation agents, such as for example hydrogen peroxide, per-borate, per-carbonate, per-sulfate, hypochlorite, permanganate, compounds of the hexavalent chromium, cupric tetramine sulfate and the like, in the absence or presence of oxidation catalysts such as copper powder, copper ions, iodine, iron salts, haemoglobin and the like, into the corresponding triazoles.

Suitable diazo components for the manufacture of the azo dyestuffs coming into question are for instance: 2-amino-1-hydroxybenzene-4-sulfonic acid and derivatives thereof substituted in 5- or 6-position by halogen or nitro groups, 2-amino-1-hydroxybenzene-6-sulfonic acid and its derivatives substituted in 4-position by halogen or nitro groups, 2-amino-1-hydroxynaphthalene-4-sulfonic acid and its derivatives substituted in the non-aminated nucleus with nitro groups.

For azo components the following compounds come into consideration: 2-aminonaphthalene-3-carboxylic acid and derivatives thereof substituted in the non-carboxylated nucleus by nitro or sulfonic acid groups and so on.

Even by coupling diazotised 2-amino-1-hydroxybenzenes which are substituted in 4- or 5-position by halogen or nitro groups or which possess in 4-position halogen or an alkyl group and in 5- or 6-position a nitro group, with derivatives of the above enumerated coupling components containing sulfonic acid groups or with 1-amino-8-hydroxynaphthalene-4- or 5-sulfonic acid there are obtained suitable o-amino azo dyestuffs.

The oxidation of the o-amino azo dyestuffs to the corresponding triazole derivatives is preferably carried out in aqueous solution by means of sodium hypochlorite. The reaction temperature varies according to the solubility or oxidisability of the o-amino azo dyestuff and is advantageously chosen as low as possible. Thus, for example, there is worked at 20° C. or at a higher temperature. The use of oxidising catalysts, such as iodine or copper powder are often of decisive importance for a smooth oxidation.

When compounds of the hexavalent chromium, such as bichromates or chromic acid, are used as oxidising agents, chromium compounds of the triazoles are formed directly which without difficulty, after their conversion into the alkali salts, yield dyestuffs of a very good levelling power and often of very remarkable fastness to light.

If ammoniacal copper salt solutions are used as oxidising agents, copper complex compounds are immediately formed which can directly be used as highly lightfast pigments, which, however, can be converted into the metal free triazole derivatives by removing the copper for instance by means of sodium sulfide or strong mineral acids.

The metal free triazoles draw from an acid bath on animal fibre and give uniform chromium dyeings of high fastness to light by treatment with compounds of the 6-valent chromium. By means of coppering mostly yellow colored pigments of high fastness to light are obtained.

A further method for the manufacture of the above defined mordant triazole compounds consists in that o-nitro azo dyestuffs of the general formula

II are converted in a manner known in itself by reduction (with alkali sulfides or zinc-ammonia water) into the corresponding 2-aryl-1:3-arylentriazoles. In this formula $R_1$, $R_2$, $X_1$ and $X_2$ have the same meanings as in the former Formula I.

For the diazo components of the o-nitro azo dyestuffs the following o-nitro amino compounds come into consideration: 3-nitro-2-aminobenzoic acid, 3-nitro-2-amino-benzoic-5-sulfonic acid (obtained by sulfonating o-chlorobenzoic acid with oleum, nitrating the chlorosulfobenzoic acid with nitric acid-sulfuric acid mixture and heating the obtained 3-nitro-2-aminobenzoic-5-sulfonic acid with ammonia water in a closed vessel up to a higher temperature), 3:5-dinitro-2-aminobenzoic acid and so on. As coupling components there are suitable for instance: β-naphthol, 1-hydroxynaphthalene-4- and -5-sulfonic acid, 2-hydroxynaphthalene-4-, -5-, -6-, -7- or -8-sulfonic acid, amino or acylaminonaphthol sulfonic acids respectively coupling in o-position to the hydroxyl group.

The reduction of the o-nitro azo dyestuffs to the corresponding triazole compounds is carried out in known manner by treatment with alkali sulfide in an aqueous solution at a raised temperature, e. g. at 80°–100° C., or with zinc dust in ammonia water also at a raised temperature. In some cases it is advantageous for the sulfide reduction to complete the reaction by adding little quantities of stronger reduction agents, such as sodium hydrosulfite or zinc and hydrochloric acid.

The products obtained according to both these methods are mostly more or less yellow colored powders which draw, from an acid bath, colorless or with yellowish color on animal fibres and give, by treatment with metal yielding agents, such as for example chromium salts, strong colorations of yellow to brownish yellow dyeings. The same are distinguished by good, in some cases even excellent fastness to light.

The present invention is illustrated by the following examples, wherein the parts are by weight, unless otherwise stated.

EXAMPLE 1

46.6 parts of the o-amino azo dyestuff from diazotised 4-chloro-(or 4-bromo-) 2-amino-1-hydroxybenzene-6-sulfonic acid and 2-aminonaphthalene-3-carboxylic acid (disodium salt) are dissolved in 500 parts of hot water, the red solution cooled to 45° C. and whilst stirring 70 parts of sodium hypochlorite solution, produced by saturating a 17% caustic soda lye with chlorine, are dropped in within 60 minutes. By the addition of 50 parts of sodium chloride, the new dyestuff partly separated from the yellow solution, is precipitated completely; it is filtered off by suction and dried. The greenish yellow powder is soluble in water with a yellow color and with a weak greenish-yellow color in concentrated sulfuric acid.

The new dyestuff dyes wool from the acid bath in greenish-yellow shades which become more intensive by after-chroming. The general fastnesses are good, the light fastness is very excellent. The new dyestuff corresponds to the formula

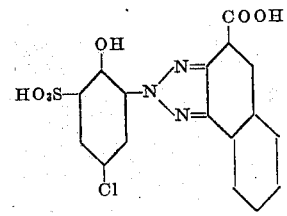

By nitrating in concentrated sulfuric acid a nitro derivative is obtained, an orange powder, which dyes wool acid in light yellow, after-chromed in yellow shades.

Instead of the amino azo dyestuff with 4-chloro - 2 - amino - 1 - hydroxybenzene - 6 - sulfonic acid used in the above example there may be used quite well an amino azo dyestuff with 2-amino - 1 - hydroxybenzene - 4 - sulfonic acid, 5-chloro - 2 - amino - 1 - hydroxybenzene - 4 - sulfonic acid or 6-chloro-2-amino-1-hydroxybenzene-4-sulfonic acid. The dyestuffs thus obtained are similar to the dyestuffs described.

EXAMPLE 2

46.6 parts of the o-amino azo dyestuff, used in Example 1, are dissolved in 1000 parts of hot water and whilst stirring a copper tetramine sulfate solution of 50 parts of crystallised copper sulfate, 200 parts of water and 56 parts of 25% ammonia water are allowed to flow in within 5 minutes. Whilst passing air through, stirring is carried out at 90–100° C. until the precipitate first colored brown, then olive green, has become pure greenish yellow, which occurs after about 20 hours. The completely formed copper compound is then sucked off, washed and dried. It is a highly lightfast pigment insoluble in water, alcohols and fats. The formation of the new compound is effected substantially quicker when the oxidation is completed with a little hydrogen peroxide or sodium hypochlorite.

The same insoluble copper compound is also obtained with other copper-yielding agents, for example copper acetate.

The copper-free dyestuff is obtained therefrom by the following process:

53 parts of the copper compound are suspended in 300 parts of boiling water and a solution of 24 parts of crystallised sodium sulfide in 100 parts of water is added, whilst the yellow sodium salt of the dyestuff, with separation of copper sulfide, passes into solution. Stirring is carried out for 10 minutes at 90° C., then it is filtered, the dyestuff separated with 50 parts of sodium chloride, allowed to cool, drawn off and dried.

45 parts of a yellow powder are obtained, which is identical with the dyestuff in Example 1.

EXAMPLE 3

13 parts of the o-amino azo dyestuff, used in Example 1, are dissolved in 650 parts of hot water and whilst stirring, a solution of 4 parts of crystallised sodium bichromate and 3.5 parts of concentrated hydrochloric acid in 50 parts of water is dropped in at 95–100° C. within 30 minutes. The red solution is first colored brown-red, then greenish and finally green yellow. After 4 hours neutralisation is effected with 1 part of anhydrous sodium carbonate and clarified. On the addition of 60 parts of sodium chloride the chromium compound is precipitated from the yellow solution as a brownish yellow powder. It is filtered off by suction and dried. The chromium compound dyes wool from a weak acid, for example 2% formic acid bath in very uniform, highly lightfast greenish-yellow shades.

The same chromium compound is also obtained by treating the dyestuff, obtained according to Example 1, with chromium yielding agents by usual methods, for example by boiling the aqueous solution with chromium acetate and subsequent conversion with sodium carbonate.

EXAMPLE 4

101.5 parts of the acid coupled dyestuff from diazotised 4 - chloro - 2 - amino - 1 - hydroxybenzene-6-sulfonic acid and 1-amino-8-hydroxynaphthalene-4-sulfonic acid are dissolved as diammonium salt in 1000 parts of hot water and dropped at 80° C. within 30 minutes into a cupric tetramine sulfate solution prepared from 100 parts of crystallised copper sulfate, 500 parts of hot water and 112 parts of 25% ammonia. Stirring is effected for 2 hours at 90° C. whilst introducing air, whereby the copper compound of the new dyestuff separates out for the most part as an olive-yellow powder. After cooling it is sucked off, suspended in 1000 parts of hot water, a solution of 96 parts of crystallised sodium sulfide in 500 parts of water is allowed to drop in within 15 minutes, stirring is effected for about another 15 minutes at 90° C. and then it is filtered from the copper sulfide. From the yellow-brown solution of the sodium salt of the new dyestuff an olive-brown powder is precipitated with acetic acid and sodium chloride. The new dyestuff dissolves in water with a yellow-brown color and dyes wool, after-chromed, lightfast brown-yellow. The new dyestuff corresponds to the formula

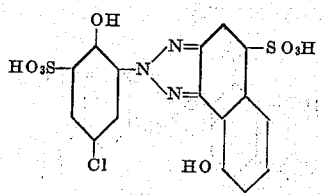

Instead of the dyestuff used in the above example a similar dyestuff with 6-nitro-2-amino-1-hydroxynaphthalene-4-sulfonic acid may be used as diazo component, whilst for the coupling component there may be used 2-aminonaphthalene-3-carboxylic acid.

EXAMPLE 5

46.1 parts of the o-nitro dyestuff, 3-nitro-2-amino-5-sulfobenzoic acid→β-naphthol, are dissolved in 450 parts of hot water and, whilst stirring, 30 parts of an ammonium sulfide solution (corresponding to 6.8 parts $(NH_4)_2S$) dropped at 80°–90° C. into the red orange solution. Under separation of sulfur the solution becomes orange yellow colored. It is clarified and treated at 50°–60° C. with the necessary quantity of sodium hydrosulfite required for obtaining a pure yellow final color of the solution (consumption 10–12 parts of hydrosulfite). Then the whole is still maintained for 30 minutes at 60° C., acidified with 35 parts of concentrated hydrochloric acid and heated up. Already in the heat the triazole dyestuff begins to precipitate out in form of light yellow crystals. Finally the whole is treated with 50 parts of hydrochloric acid, allowed to cool down, sucked off and dried.

The dyestuff dyes wool from an acid bath with yellowish shades which by treatment with salts of the hexavalent chromium change into strong reddish yellow dyeings of good fastness. The new dyestuff corresponds to the formula

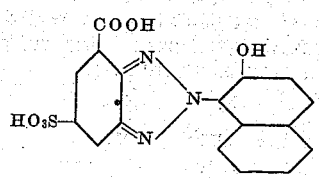

EXAMPLE 6

40 parts of the dyestuff obtained from diazotised 2:5-dichloroaniline-3-sulfonic acid (or 2-bromo-5-chloroaniline-3-sulfonic acid) and 2-aminonaphthalene-3-carboxylic acid are dissolved in 1000 parts of water and the red solution is dropped, while well stirring at 90°–100° C. within 15 minutes into a copper tetramine sulfate solution, which has been prepared by dissolving 25 parts of crystallised copper sulfate in 200 parts of water and treating with 40 parts of ammonia water (25% $NH_3$). Stirring is effected for 8 hours at 90°–100° C., while air is introduced, and the insoluble brown yellow precipitate is filtered off by suction.

The said precipitate is suspended in 400 parts of water and boiled for 30 minutes with the solution of 24 parts of crystallised sodium sulfide in 100 parts of water. It is filtered from black copper sulfide, which has separated out, and the dyestuff is precipitated in form of a yellow powder from the yellow filtrate by adding, while stirring, 50 parts of sodium chloride. This dyestuff dyes wool yellowish from an acid bath. By treatment with salts of the hexavalent chromium yellow dyeings of excellent fastness to light are obtained.

A dyestuff of similar properties is obtained by coupling in the above example, instead of diazotised 2:5-dichloroaniline-3-sulfonic acid, 2-ethoxy-5-chloroaniline-3-sulfonic acid with 2-aminonaphthalene-3-carboxylic acid and working up in the same manner as above described.

Table I

| No. | o-Amino azo dyestuff | Treated with— | Color of the powder | Shade of wool dyeing | |
|---|---|---|---|---|---|
| | | | | Acid | Chromed |
| 1 | 6-nitro-2-amino-1-hydroxybenzene-4-sulfonic acid → 2-aminonaphthalene-3-carboxylic acid. | NaClO | Yellow | Yellow | Greenish light yellow. |
| 2 | 4-nitro-2-amino-1-hydroxybenzene-6-sulfonic acid → 2-aminonaphthalene-3-carboxylic acid. | do | do | Light yellow | Light yellow. |
| 3 | 5-nitro-2-amino-1-hydroxybenzene → 2-amino-3-carboxynaphthalene-6-sulfonic acid. | do | do | do | Yellow. |
| 4 | 4-chloro-5-nitro-2-amino-1-hydroxybenzene → 2-amino-3-carboxynaphthalene-6-sulfonic acid. | do | do | do | Do. |
| 5 | 4-methyl-5-nitro-2-amino-1-hydroxybenzene → 2-amino-3-carboxynaphthalene-6-sulfonic acid. | do | do | do | Reddish-yellow. |
| 6 | 4-chloro-2-amino-1-hydroxybenzene → 1:8-amino-naphthol-4-sulfonic acid, acid coupled. | Copper amine solution + air. | Brown | Brownish-yellow | Brown-yellow. |

Table II

| No. | o-Nitro azo dyestuff | Treated with— | Color of the powder | Shade of wool dyeing | |
|---|---|---|---|---|---|
| | | | | Acid | Chromed |
| 7 | 3-nitro-2-amino-benzoic acid ⟶ 1-hydroxynaphthalene-4-sulfonic acid | $(NH_4)_2S$ | Yellow | Yellowish | Reddish-yellow. |
| 8 | 3-nitro-2-amino-benzoic acid ⟶ 1-hydroxynaphthalene-5-sulfonic acid | do | do | do | Do. |
| 9 | 3-nitro-2-amino-benzoic acid ⟶ 2-hydroxynaphthalene-4-sulfonic acid | do | do | do | Do. |
| 10 | 3-nitro-2-amino-benzoic acid ⟶ 2-hydroxynaphthalene-5-sulfonic acid | do | do | do | Do. |

3:5-dinitro-2-aminobenzoic acid yields similar dyestuffs with the coupling components cited in the dyestuffs 7–10, also when in the above dyestuffs the 2-hydroxynaphthalene-4- and -6-sulfonic acid is replaced by the corresponding -5-, -7- and -8-sulfonic acid.

What we claim is:

1. Process for the manufacture of mordant dyestuffs of the 2-aryl-1:3-arylentriazole series which comprises treating with an oxidizing agent an o-aminoazodyestuff containing sulfonic acid groups of the general formula

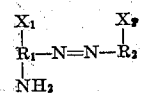

wherein $R_1$ and $R_2$ mean aromatic radicals of the benzene and naphthalene series, at least one being a naphthalene radical, $X_1$ and $X_2$ being members of the group consisting of OH, COOH, halogen and alkoxy groups each situated in one of the positions ortho and peri to the azo group, and at least one of $X_1$ and $X_2$ being an OH group in ortho-position to the azo group.

2. Process for the manufacture of mordant dyestuffs of the 2-aryl-1:3-arylentriazole series which comprises treating with an oxidizing agent an o-aminoazo dyestuff containing sulfonic acid groups of the formula

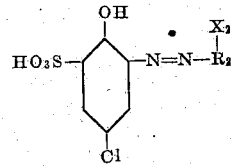

$R_2$ being a naphthalene radical substituted in o-position to the azo group by an amino group and bearing the substituent $X_2$, selected from the group consisting of OH, COOH, halogen and alkoxy groups in one of the positions ortho and peri to the azo group.

3. Process for the manufacture of mordant dyestuff of the 2-aryl-1:3-arylentriazole series which comprises treating with an oxidizing agent an o-aminoazodyestuff containing sulfonic acid groups of the formula

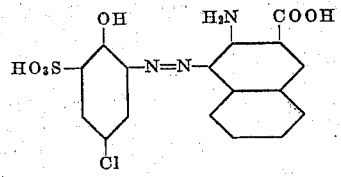

4. The metallizable 2-aryl-1:3-arylentriazole dyestuffs containing sulfonic acid groups and corresponding to the formula

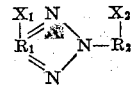

wherein $R_1$ and $R_2$ mean aromatic radicals of the benzene and naphthalene series, at least one being a naphthalene radical, $X_1$ and $X_2$ being members of the group consisting of OH, COOH, halogen and alkoxy groups each situated in one of the positions ortho and peri to the triazole group, and at least one of $X_1$ and $X_2$ being an OH group in ortho-position to the triazole group dyeing wool after-chromed in yellow light fast shades.

5. The metallizable 2-aryl-1:3-arylentriazole dyestuff of the formula

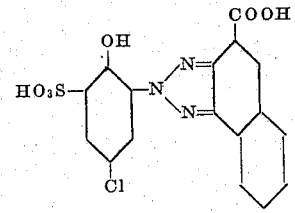

being a greenish yellow powder, dissolving in water with yellow color and in concentrated sulfuric acid with a weak greenish-yellow color, dyeing wool from an acid bath in greenish-yellow shades which become more intensive by after-chroming.

6. The metallizable 2-aryl-1:3-arylentriazole dyestuff of the formula

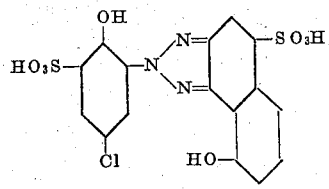

being a yellow-brown powder dyeing wool from an acid bath in brownish-yellow shades which increase powerfully in strength by after-chroming.

7. The metallizable 2-aryl-1:3-arylentriazole dyestuff of the formula

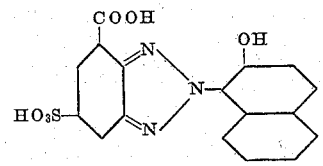

being a yellow powder dyeing wool from an acid bath in yellow shades which turn by after-chroming into reddish-yellow shades of excellent fastness properties.

ACHILLE CONZETTI.
OTTO SCHMID.